US012733075B2

(12) United States Patent
Tertinek et al.

(10) Patent No.: US 12,733,075 B2
(45) Date of Patent: Sep. 8, 2026

(54) LIGHTING DEVICE AND METHOD OF OPERATION

(71) Applicant: NXP B.V., Eindhoven (NL)

(72) Inventors: Stefan Tertinek, Graz (AT); Bernhard Grosswindhager, Graz (AT)

(73) Assignee: NXP B.V., Eindhoven (NL)

(*) Notice: Subject to any disclaimer, the term of this patent is extended or adjusted under 35 U.S.C. 154(b) by 457 days.

(21) Appl. No.: 18/187,722

(22) Filed: Mar. 22, 2023

(65) Prior Publication Data

US 2023/0345603 A1 Oct. 26, 2023

(30) Foreign Application Priority Data

Apr. 26, 2022 (EP) .................................... 22169972

(51) Int. Cl.
*H05B 47/115* (2020.01)
*H05B 47/175* (2020.01)
*H05B 47/19* (2020.01)

(52) U.S. Cl.
CPC ........... *H05B 47/115* (2020.01); *H05B 47/19* (2020.01); *H05B 47/1975* (2024.01); *H05B 47/1965* (2024.01)

(58) Field of Classification Search
CPC .. H05B 47/115; H05B 47/19; H05B 47/1965; H05B 47/1975; H05B 47/175; G01S 13/524; G01S 7/006; G01S 7/42; G01S 13/0209; G01S 13/582; G01S 13/88
USPC .......................................................... 315/294
See application file for complete search history.

(56) References Cited

U.S. PATENT DOCUMENTS

| | | | | |
|---|---|---|---|---|
| 10,764,976 | B2 | 9/2020 | Kim et al. | |
| 10,880,975 | B2 | 12/2020 | Song | |
| 11,468,333 | B2 * | 10/2022 | Lu | G06N 3/04 |

(Continued)

FOREIGN PATENT DOCUMENTS

| | | | | |
|---|---|---|---|---|
| KR | 20190072842 A | 6/2019 | | |
| WO | WO-2018031971 A1 * | 2/2018 | | G01S 13/003 |
| WO | 2019103620 A2 | 5/2019 | | |

OTHER PUBLICATIONS

Yang, Xiuzhu et al.; "Body Orientation and Vital Sign Measurement With IR-UWB Radar Network"; 2020 42nd Annual International Conference of the IEEE Engineering in Medicine & Biology Society (EMBC),; Jul. 20-24, 2020, Montreal, QC, Canada; 4 pages; DOI: 10.1109/EMBC44109.2020.9176528 (Year: 2020).*

(Continued)

*Primary Examiner* — Ryan Jager

(57) ABSTRACT

In accordance with a first aspect of the present disclosure, a networkable lighting device is provided, comprising: an ultra-wideband (UWB) communication unit; a mode controller operatively coupled to the UWB communication unit; wherein the mode controller is configured to cause the UWB communication unit to operate in a radar mode; and wherein the UWB communication unit is configured to, when operating in said radar mode, detect at least one living object present within a predefined area around or near the lighting device. In accordance with a second aspect of the present disclosure, a corresponding method of operating a networkable lighting device is conceived. In accordance with a third aspect of the present disclosure, a computer program is provided for carrying out said method.

16 Claims, 5 Drawing Sheets

(56) References Cited

U.S. PATENT DOCUMENTS

| | | | | |
|---|---|---|---|---|
| 11,653,435 | B2 * | 5/2023 | Lu | H05B 47/199 706/12 |
| 2018/0059231 | A1 * | 3/2018 | Dewberry | G01S 13/878 |
| 2019/0220728 | A1 * | 7/2019 | Lu | H05B 47/19 |
| 2019/0220729 | A1 * | 7/2019 | Lu | H05B 47/19 |
| 2020/0289033 | A1 * | 9/2020 | Sivertsen | A61B 5/7275 |
| 2021/0359774 | A1 * | 11/2021 | Tertinek | G01S 13/0209 |
| 2023/0345603 | A1 * | 10/2023 | Tertinek | G01S 13/582 |

OTHER PUBLICATIONS

Yang, Xiuzhu et al.; "Body Orientation and Vital Sign Measurement With IR-UWB Radar Network"; 2020 42nd Annual International Conference of the IEEE Engineering in Medicine & Biology Society (EMBC),; Jul. 20-24, 2020, Montreal, QC, Canada; 4 pages; DOI: 10.1109/EMBC44109.2020.9176528.

* cited by examiner

LIGHTING DEVICE AND METHOD OF OPERATION

CROSS-REFERENCE TO RELATED APPLICATIONS

This application claims the priority under 35 U.S.C. § 119 of European Patent application no. 22169972.1, filed on 26 Apr. 2022, the contents of which are incorporated by reference herein.

TECHNICAL FIELD

The present disclosure relates to a lighting device. Furthermore, the present disclosure relates to a corresponding method of operating a lighting device, and to a computer program for carrying out said method.

BACKGROUND

Detecting the presence of living objects (e.g., human beings) and monitoring their properties (e.g., their vital signs) may be regarded as an increasingly important function that can be implemented using radio frequency (RF) communication technology. However, the implementation of this function may significantly increase costs in terms of hardware resources and increase the complexity of the resulting devices and systems. Furthermore, it may not always be possible to adequately perform this function using, for example, only a mobile device carried by a user.

SUMMARY

In accordance with a first aspect of the present disclosure, a networkable lighting device is provided, comprising: an ultra-wideband (UWB) communication unit; a mode controller operatively coupled to the UWB communication unit; wherein the mode controller is configured to cause the UWB communication unit to operate in a radar mode; and wherein the UWB communication unit is configured to, when operating in said radar mode, detect at least one living object present within a predefined area around or near the lighting device.

In one or more embodiments, the UWB communication unit is further configured to, when operating in the radar mode, detect one or more properties of the living object.

In one or more embodiments, the properties of the living object include one or more vital signs.

In one or more embodiments, the mode controller is further configured to cause the UWB communication unit to operate in a ranging mode, and the UWB communication unit is configured to, when operating in said ranging mode, exchange UWB frames with one or more external lighting devices.

In one or more embodiments, the UWB frames include one or more settings applied when the UWB communication unit operates in the radar mode.

In one or more embodiments, the UWB frames include synchronization data for synchronizing radar operations of the UWB communication unit with radar operations performed by the external lighting devices.

In one or more embodiments, a localization system comprises a lighting device of the kind set forth and one or more further lighting devices, each of said further lighting devices comprising a further UWB communication unit configured to operate in the radar mode.

In one or more embodiments, the localization system comprises a system controller configured to control the lighting device and the further lighting device.

In one or more embodiments, the system controller is included in the lighting device, one of the further lighting devices or a remote-control device.

In one or more embodiments, the system controller is further configured to determine the position of the living object within the predefined area and/or the velocity of the living object, by processing results of radar operations performed by the lighting device and the further lighting devices.

In one or more embodiments, the system controller is further configured to cause one or more of the lighting device and further lighting devices to change at least one parameter of light emitted by said lighting device and further lighting devices, in dependence on the determined position of the living object within the predefined area and/or the determined velocity of the living object.

In one or more embodiments, the system controller is further configured to count the number of living objects present in the predefined area by processing results of radar operations performed by the lighting device and the further lighting devices.

In one or more embodiments, the system controller is configured to cause the lighting device and the further lighting devices to operate as monostatic radar devices or as multi-static radar devices.

In accordance with a second aspect of the present disclosure, a method of operating a networkable lighting device is conceived, the lighting device comprising a ultra-wideband (UWB) communication unit and a mode controller operatively coupled to the UWB communication unit, the method comprising: causing, by the mode controller, the UWB communication unit to operate in a radar mode; and detecting, by the UWB communication unit, when operating in said radar mode, at least one living object present within a predefined area around or near the lighting device.

In accordance with a third aspect of the present disclosure, a computer program is provided, comprising executable instructions which, when executed by a lighting device, cause said lighting device to carry out a method of the kind set forth.

DESCRIPTION OF DRAWINGS

Embodiments will be described in more detail with reference to the appended drawings.

DESCRIPTION OF EMBODIMENTS

As mentioned above, detecting the presence of living objects (e.g., human beings) and monitoring their properties (e.g., their vital signs) may be regarded as an increasingly important function that can be implemented using radio frequency (RF) communication technology. However, the implementation of this function may significantly increase costs in terms of hardware resources and increase the complexity of the resulting devices and systems. Furthermore, it may not always be possible to adequately perform this function using, for example, only a mobile device carried by a user.

Now discussed are a lighting device and a corresponding method of operating a lighting device, which facilitates adequately detecting the presence of living objects and monitoring their properties, at a relatively low cost and without significantly increasing the complexity of the device and the system or systems in which it may be integrated.

Figure 1:
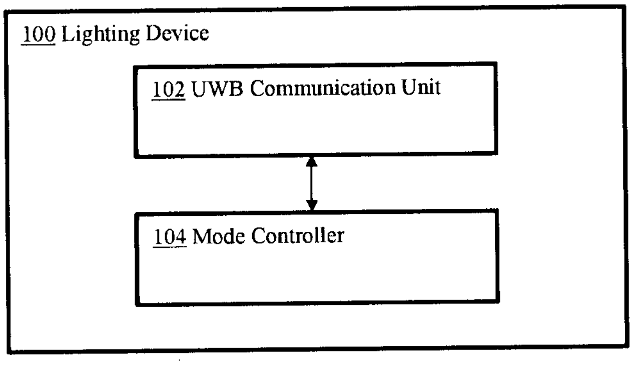
FIG. 1 shows an illustrative embodiment of a lighting device.

FIG. 1 shows an illustrative embodiment of a lighting device 100. The lighting device 100 comprises a UWB communication unit 102 and a mode controller 104 operatively coupled to the UWB communication unit 102. The lighting device 100 may be any type of device that includes a light source, such as a lighting device installed in a building, a room or an outside space. For instance, the lighting device 100 may be a so-called smart lighting device, which may be controlled remotely, and which is able to adjust its functionality in response to control signals and/or in response to environmental changes. In accordance with the present disclosure, the mode controller 104 is configured to cause the UWB communication unit 102 to operate in a radar mode. Furthermore, the UWB communication unit 102 is configured to, when operating in said radar mode, detect at least one living object present within a predefined area around or near the lighting device 100. By including a UWB communication unit 102 able to operate in a radar mode in the lighting device 100, the presence of the living object may easily be detected, at a relatively low cost and without significantly increasing the complexity of the lighting device 100. Furthermore, since the lighting device 100 is a networkable device, it may easily be integrated into a radar network, which may facilitate increasing the accuracy of the detection. In particular, the lighting device 100 may be integrated into a radar-based localization system which is able to detect living objects in the predefined area. It is noted that the predefined area may also be referred to as a monitored area. Furthermore, the term "networkable" refers to the device's ability to be integrated into a network of devices. In other words, a networkable lighting device is a lighting device which is configured to be integrated into a network of devices, in particular into a network of lighting devices. For instance, in addition to using it for detecting living objects, the UWB communication unit 102 may also be used for the purpose of integrating the lighting device 100 into a network. Alternatively, the lighting device 100 may include another communication unit (not shown) for this purpose. It is noted that the term "living object" may be defined in a broad sense, e.g., as any organism or life form that possesses or shows the characteristics of life or being alive. Examples of living objects include human beings and animals.

Ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, so-called UWB frames (i.e., UWB signals) will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). It is noted that the format of UWB frames is defined in the technical standard 802.15.4z-2020 (*IEEE Standard for Low-Rate Wireless Networks, Amendment 1: Enhanced Ultra Wideband (UWB) Physical Layers (PHYs) and Associated Ranging Techniques*).

The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The radar mode of operation may be used to advantage to detect (i.e., sense) the presence of objects or human beings. However, the radar mode of operation may also be used to estimate a distance, although with a lower accuracy than the ranging mode of operation will typically achieve. The skilled person will appreciate that the given examples are non-limiting examples of how the different modes of operation can be implemented. In other words, the modes may be implemented differently, depending on the requirements imposed by the application, for example.

UWB is becoming a standard technology for use cases requiring highly precise and accurate ranging information in industrial, smart home and healthcare applications. However, a UWB-enabled device may also be used as a radar device to enable several smart home applications. For example, in a smart lighting application a lighting device fitted with a UWB-based radar sensor may be used to control the light depending on the proximity of a nearby user. In another example, a smart device (e.g., a smart phone or a wearable device) equipped with a UWB-based radar sensor may be used to monitor a living object. In a more specific example, the vital signs of a sleeping baby may be monitored using a UWB-capable smart device. However, in such monitoring applications the radar performance (e.g., the vital-sign detection accuracy) may strongly depend on the body orientation relative to the UWB-based radar sensor. For this reason, the number of radar sensors should be increased, but this may increase the cost for the user and increase, since more sensors will be installed, the overall complexity of the system. In contrast, if only a single monitoring device is used (e.g., a smart phone), the likelihood that the function of monitoring the properties of a living object (e.g., vital signs) is not adequately performed is higher. In accordance with the present disclosure, a UWB communication unit configured to operate in a radar mode (i.e., a UWB-based radar sensor) is integrated into a networkable lighting device. This allows to form a UWB radar network in order to increase the robustness of, for instance, vital-sign monitoring applications without an additional installation cost.

In one or more embodiments, the UWB communication unit is further configured to, when operating in the radar mode, detect one or more properties of the living object. Thus, not only the presence of the living object may easily be detected at a relatively low cost and without significantly increasing the complexity of the lighting device, but also its properties. In one or more embodiments, the properties of the living object include one or more vital signs. Thus, not only the presence of the living object may easily be detected at a relatively low cost and without significantly increasing the complexity of the lighting device, but also its vital signs.

In one or more embodiments, the mode controller is further configured to cause the UWB communication unit to operate in a ranging mode, and the UWB communication unit is configured to, when operating in said ranging mode, exchange UWB frames with one or more external lighting devices. In this way, a network of lighting devices may be set up more easily, in order to increase the accuracy of the detection of the living object. More specifically, a radar network may be set up, in that each of the lighting devices may be able to operate in a radar mode and detect the living object. In one or more embodiments, the UWB frames include one or more settings applied when the UWB communication unit operates in the radar mode. In this way, a radar network may be set up and configured more easily, in that radar settings may be shared between the devices included in the radar network. In one or more embodiments, the UWB frames include synchronization data for synchronizing radar operations of the UWB communication unit with radar operations performed by the external lighting devices. In this way, a radar network may be set up and configured more easily, in that the operations of the devices included in the radar network may be synchronized more easily.

In one or more embodiments, a localization system comprises a lighting device of the kind set forth and one or more further lighting devices, each of said further lighting devices comprising a further UWB communication unit configured to operate in the radar mode. By setting up a radar network composed of UWB-enabled lighting devices, the living object as well as its properties may be detected with greater accuracy. In one or more embodiments, the localization system comprises a system controller configured to control the lighting device and the further lighting device. In this way, a centralized control may be realized, which facilitates, for example, collecting and processing detection results of each of the devices included in the radar network. In a practical implementation, the system controller may be included in the lighting device, one of the further lighting devices or a remote-control device.

In one or more embodiments, the system controller is further configured to determine the position of the living object within the predefined area and/or the velocity of the living object, by processing results of radar operations performed by the lighting device and the further lighting devices. In this way, the position and/or velocity of the living object may easily be detected, at a relatively low cost and without significantly increasing the complexity of the localization system. In one or more embodiments, the system controller is further configured to cause one or more of the lighting device and further lighting devices to change at least one parameter of light emitted by said lighting device and further lighting devices, in dependence on the determined position of the living object within the predefined area and/or the determined velocity of the living object. In this way, characteristics of the light may be changed dynamically by taking into account a user's location and movement, which may easily be determined using the radar network formed by the UWB-enabled lighting devices. In one or more embodiments, the system controller is further configured to count the number of living objects present in the predefined area by processing results of radar operations performed by the lighting device and the further lighting devices. Thus, the radar network may be used to advantage to perform additional functions, such as counting the number of persons present in a monitored area. In a practical implementation, the system controller is configured to cause the lighting device and the further lighting devices to operate as monostatic radar devices or as multi-static radar devices. In this way, the localization system may be easily set up to operate under different radar network configurations.

Figure 2:
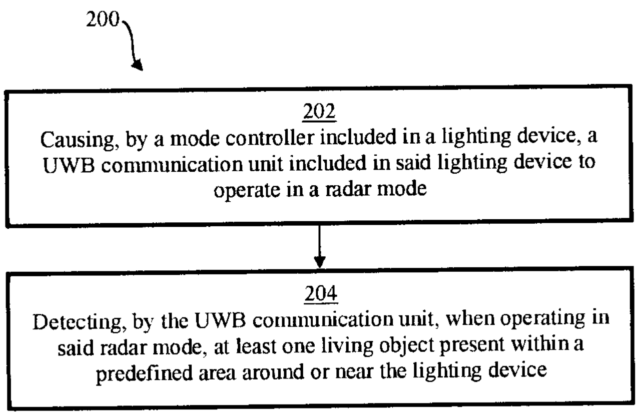
FIG. 2 shows an illustrative embodiment of a method of operating a networkable lighting device.

FIG. 2 shows an illustrative embodiment of a method 200 of operating a networkable lighting device. The method 200 comprises the following steps. At 202, a mode controller included in the lighting device causes a UWB communication unit included in said lighting device to operate in a radar mode. Furthermore, at 204, the UWB communication unit detects, when operating in said radar mode, at least one living object present within a predefined area around or near the lighting device. As mentioned above, by including a UWB communication unit able to operate in a radar mode in the lighting device, the presence of the living object may easily be detected, at a relatively low cost and without significantly increasing the complexity of the lighting device. Furthermore, since the lighting device is a networkable device, it may easily be integrated into a radar network, which may facilitate increasing the accuracy of the detection.

Figure 3:
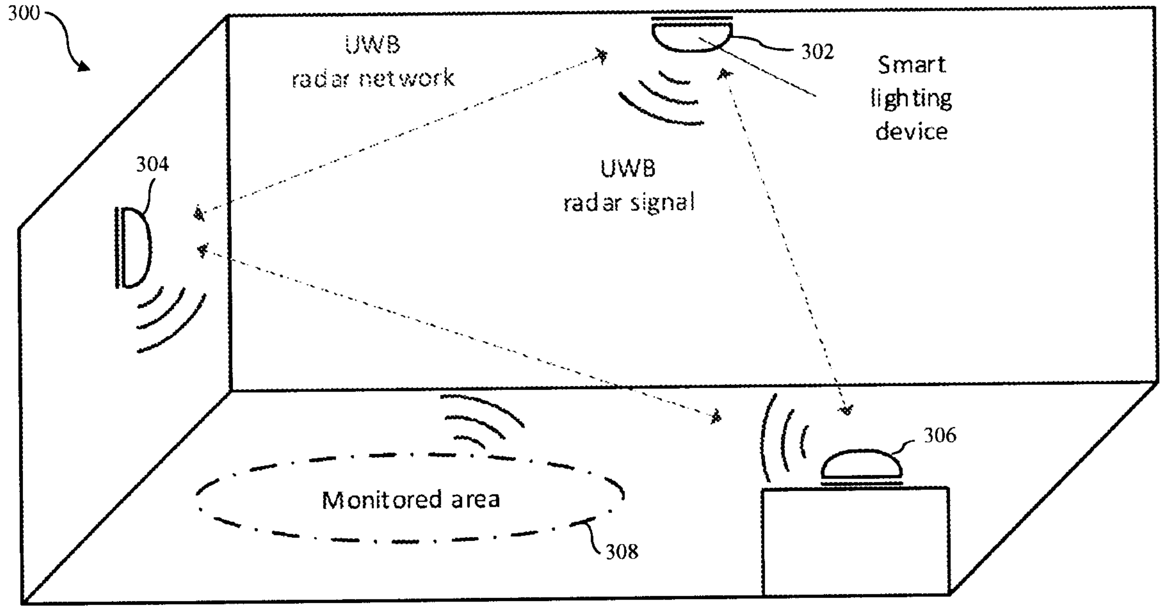
FIG. 3 shows an illustrative embodiment of a UWB radar network.

FIG. 3 shows an illustrative embodiment of a UWB radar network 300. The UWB radar network 300 comprises a plurality of smart lighting devices 302, 304, 306, each of which includes a UWB communication unit configured to operate in a radar mode. By transmitting UWB radar signals, the lighting devices 302, 304, 306 may detect one or more living objects within a monitored area 308. The use of the UWB radar network 300 facilitates increasing the accuracy of the detection, compared to the accuracy of a single device. More specifically, the lighting devices 302, 304, 306 may be equipped with a UWB chip that supports a radar mode for sensing a living object, as well as a ranging mode to communicate and to range to other devices in the network and/or external devices. For example, as shown in FIG. 3, the lighting devices 302, 304, 306 may be installed inside a room and operate as a UWB radar network to monitor a specific area referred to as the "monitored area" 308. More specifically, when operating in the radar mode, each device may transmit a UWB radar signal towards the monitored area 308, receive reflections from the monitored area 308, or both transmit a UWB radar signal and receive reflections. Furthermore, when operating in the ranging mode, the devices may exchange UWB frames in order to share a common radar configuration (e.g., frame format, pulse shape, code sequence) and/or synchronize their joint radar network operation. The synchronization may involve, for example, removing a carrier frequency, timing or phase offset from the UWB operation, and aligning the start of UWB signal transmission and reception, possibly through scheduling. The radar network 300 may improve the detection performance, for example the accuracy with which vital signs are detected.

Figure 4:
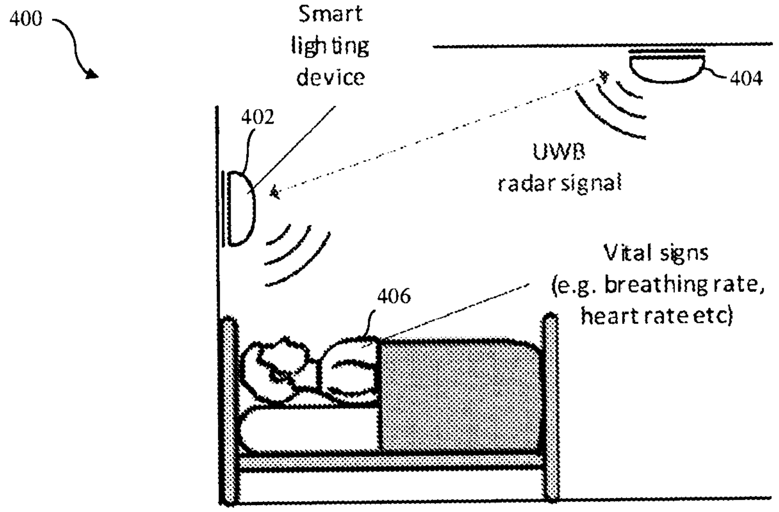
FIG. 4 shows another illustrative embodiment of a UWB radar network.

FIG. 4 shows another illustrative embodiment of a UWB radar network 400. The UWB radar network 400 comprises a plurality of lighting devices 402, 404, each of which includes a UWB communication unit configured to operate in a radar mode. By transmitting UWB radar signals, the lighting devices 402, 404 may detect a living object 406 (i.e., a sleeping person) in a monitored area (i.e., a bed). More specifically, the UWB radar network 400 may be used to perform vital-sign detection of the sleeping person. By having multiple devices 402, 404 with different monitoring angles, the monitoring performance (e.g., vital-sign detection accuracy) may be improved. Simultaneously, the lighting devices 402, 404 may retain their functionality of controlling the light depending on the motion or proximity of nearby users. Accordingly, a cost-effective multi-functional smart home solution may be provided.

Figure 5:
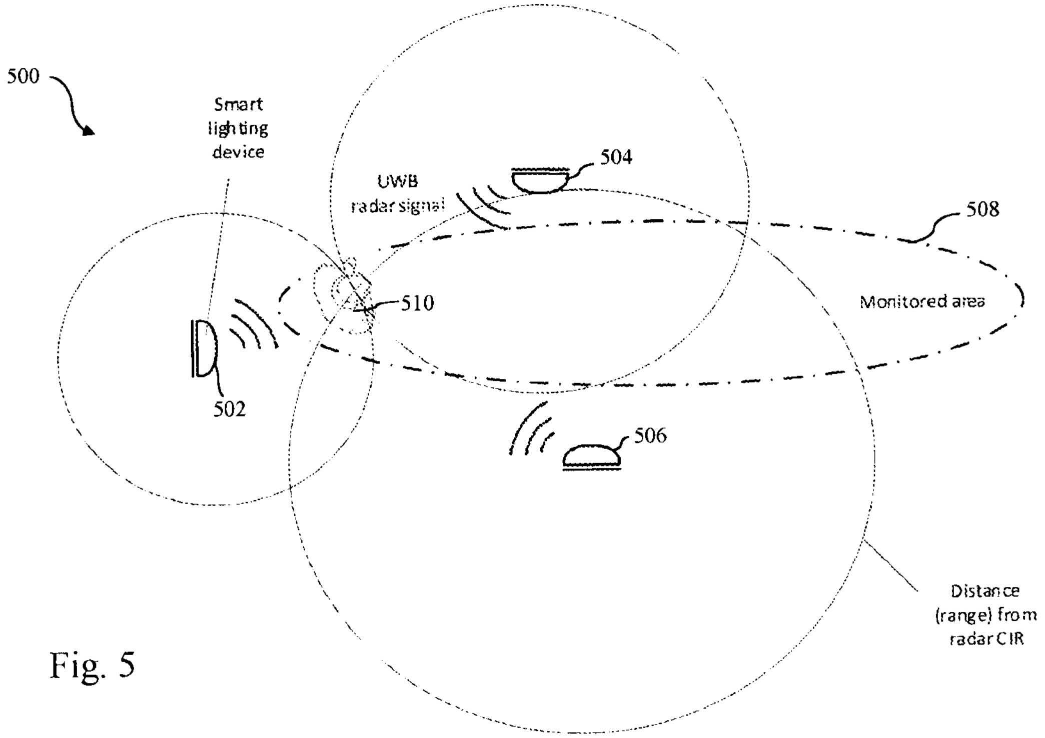
FIG. 5 shows a further illustrative embodiment of a UWB radar network.

FIG. 5 shows a further illustrative embodiment of a UWB radar network 500. The UWB radar network 500 includes a plurality of lighting devices 502, 504, 506, each of which includes a UWB communication unit configured to operate in a radar mode. By transmitting UWB radar signals, the lighting devices 502, 504, 506 may detect a living object 510 (i.e., a person) within a monitored area 508. In this example, the UWB radar network 500 may be used to track the position and velocity of the person within the monitored area 508. Due to the availability of the radar network 500 comprising several UWB radar sources, the monitored area 508 may be increased. The two-dimensional or three-dimensional position of the person may be determined by applying multilateration of the distances (i.e., the ranges) obtained from the individual radar channel impulse responses (CIRs) without requiring accurate angle-of-arrival information. The velocity may be determined, for instance, from changes in the phase of CIR taps. The accurate and robust position information provided by the radar network 500 may increase the user experience, for instance, by adapting the ambient light depending on the user's position and velocity.

In another example, a radar network of the kind set forth may be used to count the number of people within a monitored area, such as an open field or a public space, while maintaining the functionality of illuminating the monitored area. Furthermore, a radar network of the kind set forth may be configured in different ways. For example, each UWB-enabled lighting device may operate as an independent monostatic radar device, which both transmits UWB radar signals and receives reflections. In another example, multiple devices may operate as multi-static radar devices, in the sense that one device may act as a transmitter of the UWB radar signals, while the other devices act as receivers of the reflected UWB radar signals. It is noted that the configuration and operation of the radar network may be initiated in several ways. For example, one lighting device may act as controller and configure the other lighting devices as responders, with the controller being initiated by an external event. The external event may be a control signal received from a light switch or a wirelessly received control signal. Alternatively, a smart device, such as a smart phone or a wearable device, acts as the controller and controls all lighting devices as responders. A typical example of the latter would be a smart device that performs joint radar sensing with the lighting devices.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 lighting device
102 UWB communication unit
104 mode controller
200 method of operating a lighting device
202 causing, by a mode controller included in a lighting device, a UWB communication unit included in said lighting device to operate in a radar mode
204 detecting, by the UWB communication unit, when operating in said radar mode, at least one living object present within a predefined area around or near the lighting device
300 UWB radar network
302 lighting device
304 lighting device
306 lighting device
308 monitored area
400 UWB radar network
402 lighting device
404 lighting device
406 living object
500 UWB radar network
502 lighting device
504 lighting device
506 lighting device
508 monitored area
510 living object

What is claimed is:

1. A networkable lighting device comprising:
a light-emitting component;
an ultra-wideband (UWB) communication unit configured to communicate with other networkable lighting devices using UWB frames and, in a radar mode, to transmit UWB radar signals and to receive reflected UWB radar signals; and
a mode controller operatively coupled to the UWB communication unit;
wherein the mode controller is configured to cause the UWB communication unit to operate in the radar mode; and
wherein the UWB communication unit is configured to, while operating in the radar mode:
detect at least one living object present within a predefined area around or near the lighting device;
detect one or more properties of the living object including one or more vital signs; and
control at least one parameter of light emitted by one or more of the lighting-emitting component or the other networkable lighting devices in response to the detection of the one or more properties.

2. The lighting device of claim 1, wherein:
the mode controller is further configured to cause the UWB communication unit to operate in a ranging mode; and
the UWB communication unit is configured to, while operating in said ranging mode, exchange UWB frames with one or more external lighting devices.

3. The lighting device of claim 2, wherein the UWB frames include one or more settings applied while the UWB communication unit operates in the radar mode.

4. The lighting device of claim 2, wherein the UWB frames include synchronization data for synchronizing radar operations of the UWB communication unit with radar operations performed by the external lighting devices.

5. A localization system comprising:
a first lighting device, comprising:
an ultra-wideband (UWB) communication unit;
a mode controller operatively coupled to the UWB communication unit;
wherein the mode controller is configured to cause the UWB communication unit to operate in a radar mode; and
wherein the UWB communication unit is configured to, while operating in said radar mode, detect at least one living object present within a predefined area around or near the lighting device;
one or more further lighting devices, wherein each of the one or more further lighting devices includes a further UWB communication unit configured to operate in the radar mode; and
a system controller configured to control the lighting device and the one or more further lighting devices and to determine at least one of the position of the living object within the predefined area and the velocity of the living object by processing results of radar operations performed by the lighting device and the further lighting devices.

6. The localization system of claim 5, wherein the system controller is included in the lighting device, one of the one or more further lighting devices, or a remote control device.

7. The localization system of claim 5, wherein the system controller is further configured to cause one or more of the lighting device and the one or more further lighting devices to change at least one parameter of light emitted by said lighting device and further lighting devices, in dependence on the at least one of the determined position of the living object within the predefined area and the determined velocity of the living object.

8. The localization system of claim 5, wherein the system controller is further configured to count the number of living objects present in the predefined area by processing results of radar operations performed by the lighting device and the further lighting devices.

9. The localization system of claim 5, wherein the system controller is configured to cause the lighting device and the one or more further lighting devices to operate as monostatic radar devices or as multi-static radar devices.

10. A method of operating a networkable lighting device, the lighting device comprising an ultra-wideband (UWB) communication unit and a mode controller operatively coupled to the UWB communication unit, the method comprising:

causing, by the mode controller, the UWB communication unit to operate in a radar mode;

detecting, by the UWB communication unit, while operating in said radar mode, at least one living object present within a predefined area around or near the lighting device;

detecting, by the UWB communication unit, while operating in the radar mode, one or more properties of the living object, the one or more properties include one or more vital signs;

sending, by the UWB communication unit, a UWB frame to a controller, the UWB frame including information indicative of the at least one living object and the one or more properties; and receiving, by the UWB communication unit from the controller, a UWB frame including instructions to control light emitted by the lighting device.

11. The method of claim 10, the mode controller causes the UWB communication unit to operate in a ranging mode, and wherein the UWB communication unit exchanges, while operating in said ranging mode, UWB frames with one or more external lighting devices.

12. The method of claim 11, wherein the UWB frames include one or more settings applied while the UWB communication unit operates in the radar mode.

13. A non-transitory computer-readable medium storing machine instructions which, when executed by at least one processor, cause the at least one processor to:

cause a mode controller to prompt an ultra-wideband (UWB) communication unit to operate in a radar mode, wherein the mode controller and the UWB communication unit are included in a lighting device;

cause the UWB communication unit to detect, while operating in said radar mode, one or more properties of at least one living object present within a predefined area around or near the lighting device, the one or more properties including at least one vital sign associated with living object; and cause the UWB communication unit to send a UWB frame to control light emitted by one or more external lighting devices in response to detecting the one or more properties of the at least one living object.

14. The non-transitory computer-readable medium of claim 13, further comprising instructions that, when executed, cause the at least one processor to:

cause the mode controller to apply one or more settings to control light emitted by the lighting device while the UWB communication unit operates in the radar mode.

15. The non-transitory computer-readable medium of claim 13, further comprising instructions that, when executed, cause the at least one processor to:

cause the mode controller to prompt the UWB communication unit to operate in a ranging mode; and cause the UWB communication unit, while operating in said ranging mode, to exchange UWB frames with the one or more external lighting devices.

16. The non-transitory computer-readable medium of claim 15, wherein the UWB frames include synchronization data for synchronizing radar operations of the UWB communication unit with radar operations performed by the external lighting devices.

* * * * *